United States Patent Office 3,496,263
Patented Feb. 17, 1970

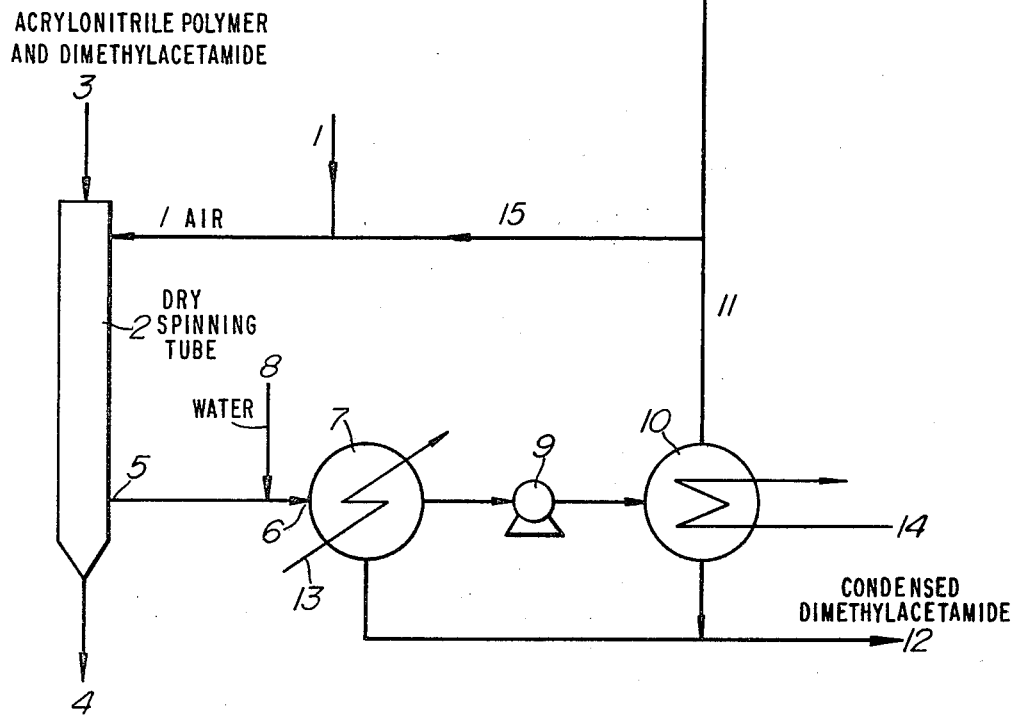

3,496,263
PROCESS FOR THE RECOVERY OF N,N-DIMETHYLFORMAMIDES OF N,N - DIMETHYLACETAMIDES FROM WASTE GASES IN THE DRY SPINNING OF POLYACRYLONITRILE BY WATER CONTACT AND CONDENSING
Chozo Nakayama, Isamu Suzuki, and Yoshiyasu Kirisako, Fuji-shi, Japan, assignors to Asahi Kasei Kogyo Kabushiki Kaisha, Kita-ku, Osaka, Japan, a corporation of Japan
Filed July 13, 1966, Ser. No. 564,774
Claims priority, application Japan, July 21, 1965, 40/43,668
Int. Cl. D01f 7/08; C08c 17/38
U.S. Cl. 264—206        7 Claims

ABSTRACT OF THE DISCLOSURE

A process for recovering N,N-dimethylformamide or N,N-dimethylacetamide as a solvent which comprises adding a fixed amount of water to a hot exhaust gas discharged in the dry spinning of a high molecular polymer such as polyacrylonitrile using said solvent and then effecting a cooling treatment to recover the amides.

---

This invention relates to a process for the recovery of N,N-dimethylformamide or N,N-dimethylacetamide, in which steam or water is added to air or an inert gas containing N,N-dimethylformamide or N,N-dimethylacetamide in order to regulate the humidity of said air or inert gas and thereafter the thus obtained mixed gas is cooled.

The inert gas referred to hereinafter mainly consists of nitrogen gas, carbon-dioxide or a mixture thereof.

When N,N-dimethylformamide or N,N-dimethylacetamide is employed as a solvent in the manufacture of acrylonitrile and other synthetic fibers or synthetic resins, it is an important problem, both from an economic view and from the viewpoint of public safety to recover the N,N-dimethylformamide or N,N-dimethylacetamide contained in the waste gases.

The cooling process, the absorption process employing water or organic solvents, the adsorption process employing adsorbents and other processes have been known for recovering N,N-dimethylformamide or N,N-dimethylacetamide. Various improvements have been made in the above-mentioned processes, but none of the enumerated processes are commercially feasible. In the conventional cooling process, the recovery rate of N,N-dimethylformamide or N,N-dimethylacetamide from air or an inert gas containing either of them is low. Especially, in a case of recovering these substances from the waste gas discharged in a dry spinning process, the waste gas containing these substances in lower concentration, the recovery rate has inevitably been particularly lowered. In order to recover N,N-dimethylformamide or N,N-dimethylacetamide in a high recovery rate, it was required to lower the temperature of the air or inert gas excessively. Brine of low temperature, i.e. below —30° C. was often required. This means that the conventional cooling process has a disadvantage in the very high cost required for cooling, and that such a high recovery rate as achieved in the present invention could not be obtained by the conventional process in spite of the use of an expensive cooling apparatus.

The absorption process also has disadvantages. That is to say, it is very difficult, due to the equilibrium between N,N-dimethylformamide or N,N-dimethylacetamide contained in air or inert gas and that contained in water or an organic solvent, to increase the concentration of N,N-dimethylformamide or N,N-dimethylacetamide contained in the absorption agents to above 10 mol percent, and therefore, a high cost is required for the separation by distillation of N,N-dimethylformamide or N,N-dimethylacetamide from these absorption agents. In addition, in effecting the recovery of N,N-dimethylformamide or N,N-dimethylacetamide by an adsorption process, a large amount of steam is required for desorption of the amides, the concentration of N,N-dimethylformamide or N,N-dimethylacetamide contained in the recovery liquid is low, and high cost is required in carrying out the processes of distillation for separating the amides from condensed steam.

One object of this invention is to provide an improved process for the recovery of N,N-dimethylformamide or N,N-dimethylacetamide from waste gases containing a low concentration of said amides produced in the manufacture of acrylonitrile and other synthetic fibers and synthetic resins, which process does not require such low temperatures as in the conventional cooling processes.

Another object of this invention is to provide a process for recovering N,N-dimethylformamide or N,N-dimethylacetamide in the form of a very much higher concentration of aqueous solution from the above-mentioned waste gases at a high recovery rate.

A further object of this invention is to provide a process for economically recovering N,N-dimethylformamide or N,N-dimethylacetamide from air or an inert gas containing either of them.

The advantageous effects of the process of this invention are that the present process, unlike the conventional recovery processes, not only improves the recovery rate of N,N-dimethylformamide or N,N-dimethylacetamide contained in air or an inert gas, but also decreases the cost required for cooling, by employing a higher cooling temperature, and also decreases the cost of distillation for separating N,N-dimethylformamide or N,N-dimethylacetamide contained in a condensed liquid by increasing the concentration of these amides in said condensed liquid.

According to this invention, steam or water is added to air or an inert gas containing N,N-dimethylformamide or N,N-dimethylacetamide in an amount such that the water content is more than 0.2 mol and less than 10 mol per mol of N,N-dimethylformamide or N,N-dimethylacetamide, and the thus obtained mixture is cooled. The inert gas referred to in this invention is nitrogen gas, carbon dioxide or a mixture thereof.

The process of this invention is explained more concretely by referring to the appended drawing in which:

1 is a tube for introducing heated air or inert gas. 2 is a dry spinning tube. 3 is a spinning nozzle, from which a spinning dope of acrylonitrile polymer and others containing N,N-dimethylformamide or N,N-dimethylacetamide as a solvent is spun out. 4 is an outlet for spun filaments. 5 is an outlet for removing hot air or inert gas containing N,N-dimethylformamide or N,N-dimethylacetamide. 7 is a first cooler, the inlet of which is represented by 6. 8 is a feeding nozzle for steam or water by which the water content is regulated within the range of 0.2 mol to 10 mol per mol of N,N-dimethylformamide or N,N-dimethylacetamide contained in the air or inert gas.

The first cooler 7 is cooled to less than 50° C. by water or air 13. 9 is a pump, 10 is a second cooler, in which the temperature of air or inert gas is maintained within a range of —10° C. and 10° C. by brine coursing through 14. 11 is an outlet for discharging gas and may be connected to pipe 15 for recycling of the gas to dry spinning tube 2. 12 is an outlet for removing the condensed aqueous solution of N,N-diethylformamide or N,N-dimethlacetamide.

Incidentally, if a temperature of air or inert gas below 25° C. is obtained in the 1st cooler 7, the second cooler 10 may be omitted. When carrying out the cooling process in two stages, the inlet into which water or steam is added may be set between the 1st cooler 7 and the second cooler 10. In these recovery processes by cooling, the recovery rate can be further improved if the waste gas discharged from the recovery system is circulated into the gas inlet 1 of the spinning tube as described above.

In practicing the present invention, heated air or an inert gas is continuously charged into a dry spinning tube 2 through a hot air tube 1 and an amide solution of a high molecular weight polymer is also continuously charged into the dry spining tube 2 through a dope transporting pipe 3. The filaments which are produced from the polymer in the spinning tube are continuously withdrawn from the outlet 4 and wound up. After adding an appropriate amount of water in the form of liquid or steam into an exhaust gas pipe 5, the exhaust gas is introduced into a first cooler 7 where it is cooled to a temperature of lower than 50° C. with cooling water 13. The solution is then fed via pump 9 into a second cooler 10 wherein the gas is cooled to a temperature of $-10°$ to 10° C. The aqueous amide solution which has been condensed in the first cooler 7 and the second cooler 10 is continuously withdrawn through outlet 12, while the exhaust gas containing substantially no solvent vapor is discharged from an exhaust gas pipe 11 or is sent to a gas heating apparatus (not shown) through a recycle pipe 15 and is heated there and again supplied to the dry spinning tube 2 through the hot air tube 1.

According to the process of this invention, more than 50% of the N,N-dimethylformamide or N,N-dimethylacetamide contained in the air or inert gas is recovered in the 1st cooler 7 and almost the entire amount of the residual N,N-dimethylformamide or N,N-dimethylacetamide is condensed in the 2nd cooler to be recovered. As a result, the final recovery rate of N,N-dimethylformamide or N,N-dimethylacetamide approximate a very high value above 96%. Further in this case, the concentration of N,N-dimethylformamide or N,N-dimethylacetamide contained in the condensed liquid is above 15 mol percent. That is to say, either of these amides is recovered as an aqueous solution having very much higher concentration than that obtained by an absorption process.

Incidentally, if the temperature of air or inert gas can be kept below 25° C., the second cooler can be omitted by circulating the residual gas which contains a little unrecovered N,N-dimethylformamide or N,N-dimethylacetamide and one obtains an effect equivalent to that obtained by a 2 stage cooling process, which is an economical advantage. In this case, more than 70% of N,N-dimethylformamide or N,N-dimethylacetamide which is contained in the air or inert gas can be recovered and the concentration of the said amide in the condensed liquid exceeds 30%.

In the process of this invention, the more steam or water which is added, the more the recovery rate is improved, but the lower becomes the concentration of N,N-dimethylformamide or N,N-dimethylacetamide in condensed liquid. Commercially, that is to say, considering the cost for cooling, the loss of solvents and the separation of said amides, when the concentration of N,N-dimethylformamide or N,N-dimethylacetamide in air or inert gas is low, water or steam should be added in the smallest amount possible in order to increase the concentration of N,N-dimethylformamide or N,N-dimethylacetamide contained in the condensed liquid, and lower the cost of the distillation for separating said amides from the aqueous solution. When the concentration of said amides in said gas is above 10 mol percent, water need not be added.

Otherwise, the amount of water to be added should be increased in order to improve the recovery rate of N,N-dimethylformamide or N,N-dimethylacetamide when the concentration of said amides in air or inert gas is low. Even if the content of the solvents in air or inert gas is small, when the amount of water to be added exceeds 10 mol per mol of N,N-dimethylformamide or N,N-dimethylacetamide, economical advantages are lost with respect to the separation by distillation. On the contrary, even if the content of these solvents in air or inert gas is large, when the amount of water to be added reaches less than 0.2 mol per mol of N,N-dimethylformamide or N,N-dimethylacetamide, the recovery rate, which is one of the characteristics of this invention, is decreased. For these reasons, it is most economically suitable to maintain the amount of water contained in the air or inert gas within the range of 0.2 mol to 10 mol per mol of the N,N-dimethylformamide or N,N-dimethylacetamide.

Furthermore, in the process of this invention, when the temperature of the air or inert gas is lowered as much as possible, the recovery rate of N,N-dimethylformamide or N,N-dimethylacetamide increases, but the cost for cooling increases. Therefore, when a two stage cooling system is adopted, it is economically most suitable to lower the temperature of the air or inert gas to below 50° C. in the 1st cooler and then lower the temperature thereof from 10° C. to $-10°$ C. by employing brine in the 2nd cooler. When a single stage cooling process is adopted, the recovery rate of N,N-dimethylformamide or N,N-dimethylacetamide is less than in the two stage process.

In the case of omitting the second cooler, the cooling temperature is advantageously kept below 25° C. If the temperature cannot be kept below 25° C., the loss of N,N - dimethylformamide or N,N - dimethylacetamide which is not recovered becomes so high that the benefit of this process is lost from the viewpoint of economy. Many other cooling processes can be considered, and if water or steam is added to the air or inert gas containing N,N-dimethylformamide or N,N-dimethylacetamide within the range of 0.2 mol to 10 mol per mol of N,N-dimethylformamide or N,N-dimethylacetamide and the temperature of the air or inert gas can be maintained within the above-mentioned range, the same effects as in the above mentioned process can be expected.

The following are examples illustrating this invention:

EXAMPLE 1

Steam was added to air having a temperature of 200° C. and containing 0.5 mol percent of N,N-dimethylformamide discharged from the dry spinning tube in an amount such that the water content of air reaches 2 mol percent (4 times as much as N,N-dimethylformamide), and the mixed gas thus obtained was introduced into the 1st cooler to be cooled by water to a temperature of 20° C. Said mixed gas was then introduced into the 2nd cooler and cooled by brine to a temperature of 0° C. 70% of N,N-dimethylformamide was condensed in the 1st cooler, and in the 2nd cooler 29% thereof was condensed.

The total recovery rate of N,N-dimethylformamide was 99%. In addition, the concentration of N,N-dimethylformamide in condensed liquid was 25 mol percent.

EXAMPLE 2

Steam was added to air of 100° C. and containing 1 mol percent of N,N-dimethylformamide so that the water content of the air was 0.2 mol percent and then the mixed gas was cooled, as in Example 1, to a temperature of 20° C. in the 1st cooler and to 0° C. in the 2nd cooler. In the 1st cooler, 70% of N,N-dimethylformamide was recovered and the final recovery rate in the entire system including the 2nd cooler was 96%. In addition, the concentration of the N,N-dimethylformamide contained in the condensed liquid was 87 mol percent.

EXAMPLE 3

Water was added to nitrogen gas containing 3 mol percent of N,N-dimethylformamide so that the water content of the gas was equimolar to the N,N-dimethylformamide, and the mixed gas thus obtained was cooled to 30° C. by air in the 1st cooler and to 5° C. by brine in the 2nd cooler. In this case, the recovery rate of N,N-dimethylformamide was 88% in the 1st cooler and 97% in the entire system. The concentration of the N,N-dimethylformamide contained in the condensed liquid was 55 mol percent.

EXAMPLE 4

Steam was added to air of 200° C. containing 1 mol percent of N,N-dimethylacetamide so that the water content of the air was 2 mol per mol of N,N-dimethylacetamide. The mixed gas thus obtained was introduced into the 1st cooler to be cooled to 15° C. and then introduced into the 2nd cooler to be cooled to −5° C. In the 1st cooler, 83% of the N,N-dimethylacetamide was recovered and the total recovery rate thereof in the entire system including the 2nd cooler was 98%. The concentration of the N,N-dimethylacetamide contained in the concentrated liquid was 40 mol percent.

EXAMPLE 5

Steam was added to air of 150° C. containing 1 mol percent of N,N-dimethylacetamide so that the water content of the gas was 5 mol per mol of the N,N-dimethylacetamide and the mixed gas thus obtained was cooled to 15° C. by employing water of 10° C. only in the 1st cooler. In this case, the recovery rate of the N,N-dimethylacetamide was 87% and the concentration of the N,N-dimethylacetamide contained in the concentrated liquid was 40 mol percent.

What we claim is:

1. A process for the recovery of amides contained in a gaseous mixture exiting from a dry spinning tube in which polymer filaments are formed, said amides having the formula

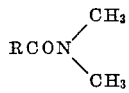

wherein R is H or CH$_3$, said process comprising discharging polymer filaments containing said amides as solvent from a spinning nozzle into a dry spinning tube, removing the spun filament from an outlet of the tube, introducing a heated gas into the spinning tube for concurrent flow therein with the filament to vaporize said amides, withdrawing from the spinning tube the gas containing the vaporous amides as a gaseous mixture, adding water to said withdrawn gaseous mixture in an amount such that the water content in said withdrawn gaseous mixture is within the range of 0.2 to 10 mols per mol of said amides and then cooling the mixture thus obtained to condense the amides.

2. A process as claimed in claim 1, wherein the cooling is effected in two cooling stages, a first stage in which the gas is cooled to a temperature of below 50° C. and a second stage in which the gas is cooled to a temperature between −10° C. and 10° C.

3. A process as claimed in claim 1, wherein the cooling is effected in one stage, the gas being cooled to a temperature of below 25° C., and further comprising recycling the gas after separating the condensed amides.

4. A process as claimed in claim 1, wherein the gas is air or an inert gas.

5. A process as claimed in claim 4, wherein the inert gas is nitrogen, carbon dioxide or a mixture thereof.

6. A process as claimed in claim 1, wherein the H$_2$O is in liquid form.

7. A process as claimed in claim 1, wherein the H$_2$O is in vapor form.

References Cited

UNITED STATES PATENTS

| 2,335,922 | 12/1943 | Dreyfus | 264—205 |
| 2,472,842 | 6/1949 | Mouchiroud et al. | 264—205 |
| 2,761,754 | 9/1956 | Jones et al. | 264—169 |
| 2,957,748 | 10/1960 | Lieseberg | 264—206 |
| 3,094,374 | 6/1963 | Smith | 264—205 XR |
| 3,342,862 | 9/1967 | Board et al. | 260—561 |
| 3,324,107 | 6/1967 | Andrews | 264—206 |
| 3,360,443 | 12/1967 | Apotheker | 260—561 |
| 3,415,922 | 12/1968 | Carter et al. | 264—205 |

FOREIGN PATENTS

| 994,141 | 6/1965 | Great Britain. |
| 1,123,283 | 9/1956 | France. |

WILBUR L. BASCOMB, JR., Primary Examiner

U.S. Cl. X.R.

62—20; 203—42, 49, 87, 97; 260—32.6, 561; 264—237